Sept. 17, 1940.  J. HARRINGTON  2,214,740
STOKER
Original Filed June 30, 1934  3 Sheets-Sheet 1

Inventor
Joseph Harrington
By: Cox + Moon attys.

Sept. 17, 1940. J. HARRINGTON 2,214,740
STOKER
Original Filed June 30, 1934 3 Sheets-Sheet 3

Inventor:
Joseph Harrington
By Cox & Moon Att'ys

Patented Sept. 17, 1940

2,214,740

UNITED STATES PATENT OFFICE 2,214,740

STOKER

Joseph Harrington, Riverside, Ill.

Application June 30, 1934, Serial No. 733,260
Renewed May 6, 1939

12 Claims. (Cl. 110—38)

My present invention relates in general to fuel consumption and has more particular reference to a means for and method of feeding fuel to a furnace, the invention relating to a mechanical stoker especially well adapted for delivering coal into a furnace and associated means for conveying the fuel through the furnace as the same is consumed and for removing the residual ash as a continuous process.

An important object of the invention is to provide for delivering fuel to a furnace by delivering a charge of fuel upon a grate reciprocating under a stationary barrier wall forming a part of the furnace, the fuel being deposited when the grate is at the inmost limit of its travel into the furnace, a further object being to advance the fuel charge on the grate by moving the grate outwardly of the furnace under the wall.

Another important object is to utilize a stationary barrier wall in conjunction with a reciprocating grate to advance fuel on the grate.

Another important object is to provide a stationary abutment above a reciprocating grate and facing inwardly of the furnace in order to utilize the relative motion between grate and wall to advance a fuel bed on the grate as the grate moves toward and under the wall, the fuel bed being carried away from the abutment and into the furnace during the reverse motion of the grate to leave a void in the fuel bed adjacent the abutment and into which void additional fuel may be charged and then advanced into the furnace by the reciprocation of the grate.

Another important object is to provide means for progressively charging a furnace with fuel from a hopper and removing ashes from the furnace whereby to provide progressive travel of the fuel bed in the furnace from the charging hopper to the ash exit, while breaking the continuity of the fuel bed between hopper and furnace to prevent the fuel from becoming ignited in the hopper.

Another object is to charge fuel into a furnace, having a progressively moving fuel bed, in such a way that the fuel is ignited by surface contact with previously ignited fuel.

Another object is to feed fuel onto a fuel bed in a furnace in such a way that each charge, as it is introduced into the furnace, is delivered into a void formed in the fuel bed and ignited at the bottom by surface contact with previously ignited fuel as well as on top by the heat of the furnace in order to promote uniform complete combustion.

Another object is to control the rate of travel of the fuel bed in the furnace solely as a function of the amount of fuel contained in each charge delivered to the furnace.

Another object is to stoke a furnace by manipulating the fuel bed in the furnace to form a void in its upper surface near the fuel inlet and by delivering a fuel charge into the void.

Another object is to utilize the charge itself to move the fuel bed on the grate.

Another object is to maintain unburned fuel on the grate at the ash discharge end thereof until it is completely consumed.

Another object is to provide an adjustable ash discharge throat which may be adjusted to permit discharge of ash while preventing the discharge of unconsumed or partly consumed fuel.

Another object resides in the provision of a fuel back stop beneath which a grate section is reciprocated in order to advance a fuel bed on the grate section and including means to adjust the stroke of the grate section in order to control the amount of fuel displacement on the grate.

Another important object resides in providing for the progressive removal of ashes from the furnace and more particularly in providing a drag sweep conveyor for carrying the ashes from the discharge end of the grate structure and delivering same into a covered receptacle.

Another important object is to provide means including a hopper and mechanism for advancing fuel from the hopper and delivering same into the furnace upon a reciprocating grate section thereof in front of the backstop, said advancing device being operated in synchronism with the movement of the grate section in order to deposit a quantity of fuel in the space left between the fuel bed and the back stop as a result of the reciprocation of the grate section with respect to the back stop.

Another important object is efficiently to use a motor to drive a reciprocating device, specifically a stoker or furnace grate, together with two additional power consuming devices specifically a device for feeding fuel onto the grate and an ash carrier, by connecting the additional devices to the motor in such a way that power is delivered to the additional devices alternately and at intervals when the reciprocating device is at or near a limit of its reciprocating stroke whereby the maximum power required to operate one of the additional devices is delivered by the motor when the reciprocating device is at or near one end of its stroke, i. e. when the motor is supplying minimum driving power to the reciprocating device, and the power to operate the other of the additional devices is delivered by the motor when the reciprocating device is at or near the other end of its stroke, i. e. when the motor is again supplying a minimum driving power to the reciprocating device, the power supplied by the motor to the additional devices being a minimum when the reciprocating device is in middle stroke traveling in either direction whereby the load on the motor is made as continuously uniform as possible, thus enabling use of a motor of smaller capacity than would be necessary if the devices were connected to receive driving power at the same time.

Another object is to provide an automatic stoker having features of novelty rendering it especially well adapted to control the continuous consumption of fuel in relatively small quantities as in house heating as distinguished from commercial heating where relatively large quantities of coal are consumed; although my present invention is not, of course, necessarily limited to stokers of small capacity.

Among the other objects of the invention are to provide a practical domestic stoker adapted for home heating; to provide a stoker having the several structural novelties hereinafter more fully described; and to provide a new method for advancing coal into and through a furnace as taught herein.

Numerous other objects and advantages will be apparent from the following description, which, taken in connection with the accompanying drawings, discloses a preferred embodiment of my invention.

Referring to the drawings.

Figure 1:
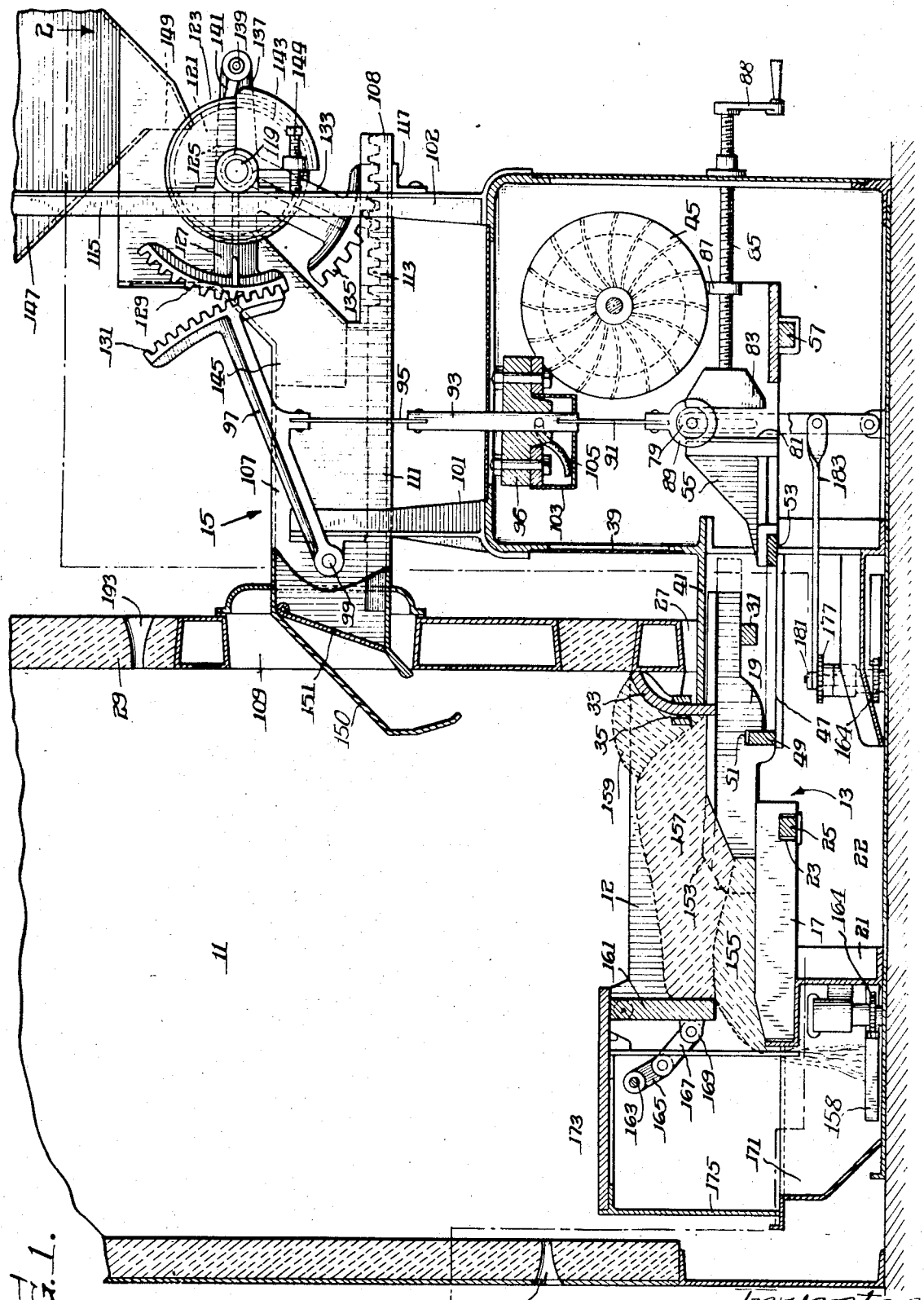
Figure 1 is a longitudinal section taken vertically through a furnace and associated structures embodying my present invention, the section being taken substantially along the line 1—1 in Figure 3.

To illustrate my invention, I have shown on the drawings a mechanical stoker mechanism embodying my present invention as applied in delivering fuel for consumption in a furnace 11. The furnace 11 may be of any suitable or preferred construction having a fire pot 12. The fire pot 12 is provided with a grate 13 and an associated stoker 15 for delivering fuel to the grate. The grate, in the illustrated embodiment, comprises stepped sections including a stationary section 17 and a reciprocating section 19, although it will be obvious that additional stationary and movable sections may be employed if desired. The stationary and movable grate sections are arranged in stepped relationship, one end of the movable section 19 resting upon and being supported by the stationary section.

The grate bars forming the stationary section rest upon and are supported by an angle member 21, which, in turn, is secured to and supported by the floor of the furnace structure. The angle member 21 comprises a plate which extends between opposed side walls of the fire pot to define with said side walls an enclosed air space 22 under the grate.

The opposite ends of the grate bars, forming the stationary section, are provided with notches 23 shaped to receive a support bar 25, which extends horizontally across and is supported in the opposite side walls of the fire pot so that the bars of the grate section 17 are supported in a manner preventing endwise movement by the bar 25. The grate bars, forming the movable section 19, slidably rest at one end upon the bars forming the stationary section 17, extend through an opening 27 in the front wall 29 of the furnace structure and slidingly rest at their opposite ends upon a support bar 31 horizontally mounted in the opening 27. Above the grate section 19, I arrange a back stop 33 comprising a preferably curved plate extending entirely across the movable grate section and supported at its opposite ends in slots 35 formed in the upper side walls of the fire pot 12. The plate, forming the back stop rests at its lower edge upon the upper surface of the movable grate section 19, the upper edge of said plate bearing on the inner surface of the furnace wall 29 so that the plate is supported in the fire pot in position closing the opening 27 above the movable grate section 19. The movable grate section 19, however, is free to reciprocate beneath the back stop 33 which is vertically movable in the slots 35, the back stop resting its weight upon the movable grate section and forming a riding seal thereon to prevent the escape of fuel between the movable grate section and said back stop, and means, powered from a motor 37 mounted outside of the furnace and preferably enclosed in a casing 39, is provided for imparting the reciprocating movement to the grate 19.

The casing 39 comprises a cabinet having a projection 41 which extends through the opening 27 to afford a channel through which the grate reciprocating mechanism extends into the furnace below the fire pot 12. The channel 41 also provides a passageway through which air may be delivered under force drafts into the space 22 beneath the grate sections, the air being drawn into the casing 39 through an opening 43 by means of a fan 45, the intake of which communicates with the opening 43. The fan 45 is driven by the motor 37, being preferably attached directly to the motor shaft. The casing extension, forming the walls of the channel 41, abuts behind the plate forming the back stop. The grate reciprocating mechanism comprises a frame 47 slidingly mounted in the opposite side walls of the casing extension 41. The frame 47 carries a cross bar 49, which extends in slots 51 formed in the lower edges of the grate bars forming the section 19.

The frame 47 has another cross bar 53 adapted to be received in a seat formed in a frame 55, which frame is disposed within the casing 39 and slidingly supported therein on a cross-member 57. Means within the casing 39 is provided to reciprocate the frame 55 and hence to reciprocate the grate section 19 by means of the transfer frame 47. To this end, the shaft of the motor 37 is provided with a worm 59, driving a worm wheel 61 mounted on a shaft 63, journaled in a casing 65, which is supported in the casing 39. The casing 65 serves to enclose the worm 59, the worm wheel 61, the shaft 63 and an additional worm 67, which is mounted on the shaft 63 and which drivingly engages a cooperating worm wheel 69 which also is enclosed within the casing 65.

The worm wheel 69 is mounted on a shaft 71, journaled in the casing 65. The opposite ends of the shaft 71 extend outwardly of the casing and carry crank arms 73 and 75. The crank 75 has a pin 77 carrying a roller 79 and the frame 55 has means forming spaced abutments 81 and 83 between which the roller 79 is arranged so that as the crank 75 is rotated, the roller will press against the abutment 81 to move the frame in one direction and will then press against the other abutment 83 in order to move the frame in the opposite direction. The means, forming the abutment 83 on the frame 55, is adjustable in order to vary the space between the opposing abutments 81 and 83 to thus control the stroke of the frame 55 and hence the stroke of the movable grate section 19. To this end, the abutment 83 is formed as a block slidable on the frame 55, the block being connected to a threaded rod 85 extending through and threadingly engaging an abutment 87 formed on the frame 55. The rod 85 is provided with a handle 88 so that by turning the handle, the abutment 83 may be shifted on the frame 55 to vary the spacement between the stationary abutment 81 and the movable abutment 83 to thus vary the travel of the movable grate section 19.

The crank pin 77 also carries a bearing member 89 to which is attached one end of a leaf spring 91. The other end of this leaf spring is connected to a rod 93, which is journaled for longitudinal movement in a bearing block 96 carried by the casing 39. The rod 93 extends outwardly of the casing 39 through the block 96 and is connected by means of a second leaf spring 95 to a lever 97, pivoted as at 99 on a support frame 101 mounted on and carried by the casing 39. The bearing block 96 is provided with means forming a lubricant reservoir 103 and the bearing block and shaft are lubricated by means of a wick 105 extending in said reservoir. The lever 97 actuates the coal delivery mechanism 15 and it will be obvious that as the crank 75 rotates, the lever 97 will be moved in an oscillating fashion on its pivot 99 by means of the rod 93 and the connecting springs 91 and 95, the springs bending laterally as the crank rotates in order to permit the reciprocating rod 93 to move on the block 96.

Figure 5:
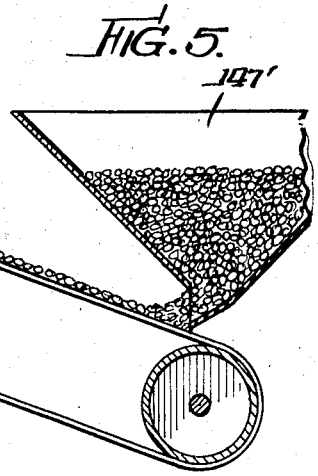
Figure 5 is a view in vertical section illustrating a modification of the structure shown in Figure 4 in order to provide for the delivery of fuel to the stoker from a remote storage bin.

The fuel delivery mechanism 15 comprises a preferably sheet metal conduit 107 having a delivery end extending through an opening 109 formed in the furnace wall 29 above the grate section 19. A pusher bar 111 is reciprocably mounted in the conduit 107 and extends outwardly through an opening in the end of the conduit opposite from the fuel delivery end thereof, said outwardly extending pusher bar portion being formed with a rack 113 and the bottom of the conduit being provided with an extension 108 underlying the rack. The fuel conduit 107 thus forms a support for the reciprocable pusher bar. The conduit moreover is supported near one end on the frame 101 and its projection 108 is also supported on a frame 102, which, like the frame 101, is mounted on and carried by the casing 39. The frame 102 comprises spaced uprights 115 between which the cross member 117 is mounted in position to support the bottom of the fuel conduit 107 and the extension 108 thereof, which carries the pusher bar rack 113. A shaft 119 is supported between the uprights 115 above the cross-bar 117 and a fuel feeding drum 121 is fixed on the shaft 119 for rotation therewith. A friction drive wheel 123 also is fixed on the shaft 119, which also carries a spider 125 journaled thereon between the fuel-feeding drum and the friction-drive wheel, said spider having a radially extending leg 127 carrying a gear segment 129 in position to meshingly engage a co-operating gear quadrant 131 carried by the lever 97. The spider 125 has another leg 133, the outer end of which extends beneath the fuel feeding drum 121 and carries a gear segment 135 in position to mesh with the leg portion 113 of the fuel pusher 111. The spider 125 has still another arm 137, the end of which is provided with a pin 139 on which is mounted a friction pawl 141 in position to bear upon the surface of the friction drive wheel 123. The friction pawl 141 co-operates with the surface of the drive wheel 123 in such a way that when the spider 125 is rotated in one direction on the shaft 119 during the downward movement of the shaft 93, the friction wheel will be rotated in one direction to thus rotate the shaft 119 and fuel feeding drum. During the upward movement of the shaft 93, however, the pawl 141 will ride freely upon the surface of the wheel 123 and the wheel 123 and the fuel feeding drum will remain stationary. The shaft 119 also carries a tiltable pawl-control device 143 comprising a shell-like member having an edge underlying the pawl 141. The shell-like member carries a bolt 144, the end of which bears against a plate carried by one of the uprights 115. By rotating the bolt 144, the angular position of the shell 143 may be changed, that is to say, the edge of the shell, which underlies the pawl, may be raised or lowered. If said edge be raised, it will be obvious that the pawl may be prevented from engaging the surface of the wheel 123 during the initial portion of its wheel-driving movement, consequently the amount of movement imparted to the drive wheel 123 during each operating stroke of the pawl may be reduced to any amount, in fact, the shell 143 may be adjusted to a position in which the pawl does not engage the wheel 123 at any time during its operating stroke and so by means of the pawl control shell 143 it is possible to vary the rotation of the fuel feeding drum 121 between a maximum movement during each fuel stroke and zero movement. The fuel conduit 107 is provided with a fuel chute 145, which enters the conduit above the pusher rod 111 and extends to the fuel feeding roller 121. A fuel hopper 147, preferably mounted on the uprights 115, has a fuel discharging outlet 149 in position to deposit fuel upon the upper surface of the roller 121, in such a way that when the drum is rotated as aforesaid by means of the driving pawl 141, the fuel will be carried by the drum from the hopper outlet 149 and delivered into the chute 145 through which the fuel will fall into the conduit 107. Alternatively, as shown in Figure 5, the fuel hopper may be disposed at a distance from the feeding drum, as shown at 147' in position to deliver the fuel upon an endless belt conveyor which travels on spaced rollers, one of which is the fuel feeding drum and the other of which is disposed under the remotely situated hopper.

As the spider is oscillated on the shaft 119, the arm 133 will cause the fuel pusher 111 to reciprocate in the conduit at 107 so that the fuel delivered into the conduit through the chute 145 will be advanced through the conduit toward the discharge end thereof into the furnace and fall upon the shiftable grate section 19 in front of the back stop 33, the forward or discharge end of the fuel conduit 107 is preferably provided with a deflector hood 150 in order to prevent the fuel from scattering in the furnace and to drop the fuel immediately in front of the back stop 33. The forward end of the fuel conduit is also preferably provided with a hinged plate 151, the same normally closing the discharge end of the conduit but opening sufficiently to permit fuel to enter the furnace. In operation, a charge of fuel is delivered through the conduit 107 into the furnace 11 and drops upon the shiftable grate section 19 immediately in front of the back stop when the grate section is in the position illustrated in dotted lines 153 in Figure 1 of the drawings. This is accomplished by properly synchronizing the movement imparted to the pusher 111 with the movement of the grate section 19. After the fuel charge is thus delivered on the grate section 19, the section is retracted under the back stop 33 and the fuel, on account of the relative movement between the grate section 19 and the back stop, is advanced on the grate section. It will be noted that the fuel charge rests against the back stop and in part upon the upper curved portion thereof and thus tends to hold the back stop down upon and in sealing engagement with the top of the movable grate section 19 to enhance the sealing effect between the back stop and said grate section, thereby preventing the escape of any fuel between said parts. During the next succeeding forward movement of the grate section under the back stop, the fuel charge will be advanced in the furnace leaving a notch or void between the fuel bed and the back stop so that the next succeeding fuel charge ejected from the conduit 107 by the forward movement of the pusher 111 will drop into and fill the void immediately in front of the back stop 33. Eventually, the fire pot 12 becomes filled with burning fuel which assumes the relative position indicated in Figure 1, wherein the burned ash is shown at 155, burning fuel at 157, and the charge of additional fuel at 159.

At the ash discharge end of the grate, I provide means forming an adjustable ash discharge throat. For this purpose an adjustable shutter 161 of heat-resisting material such as fire brick is carried on a suitable preferably metal frame, said shutter extending between and pivoted in the upper portions of the opposed fire pot side walls for tilting movement about a horizontal axis. The shutter has a lower edge spaced above the discharge end of the stationary grate section and by tilting the shutter the distance between its lower edge and the grate may be varied. The opening between the shutter and grate constitutes a variable ash discharge throat and since the partially burned fuel 157 rides on the top of the ash bed 155 in an up draft furnace, the shutter may be adjusted to hold the unburned fuel in the firepot while permitting ashes to escape through the throat.

Adjusting means, operable from outside of the furnace for setting and locking the shutter in adjusted position, is also provided. In the illustrated embodiment, the adjusting means comprises a shaft 163 journalled in the walls of the furnace and having an outer end provided with a suitable handle and means to lock the handle in various angular positions. The shaft has an inner end carrying a radial finger 165. A connecting link 167 is pivotally connected at its opposite ends to the finger 165 and a lug 169 on the shutter so that by turning the handle of the shaft, the shutter may be turned on its axis to vary the width of the ash discharge throat.

Figure 3:
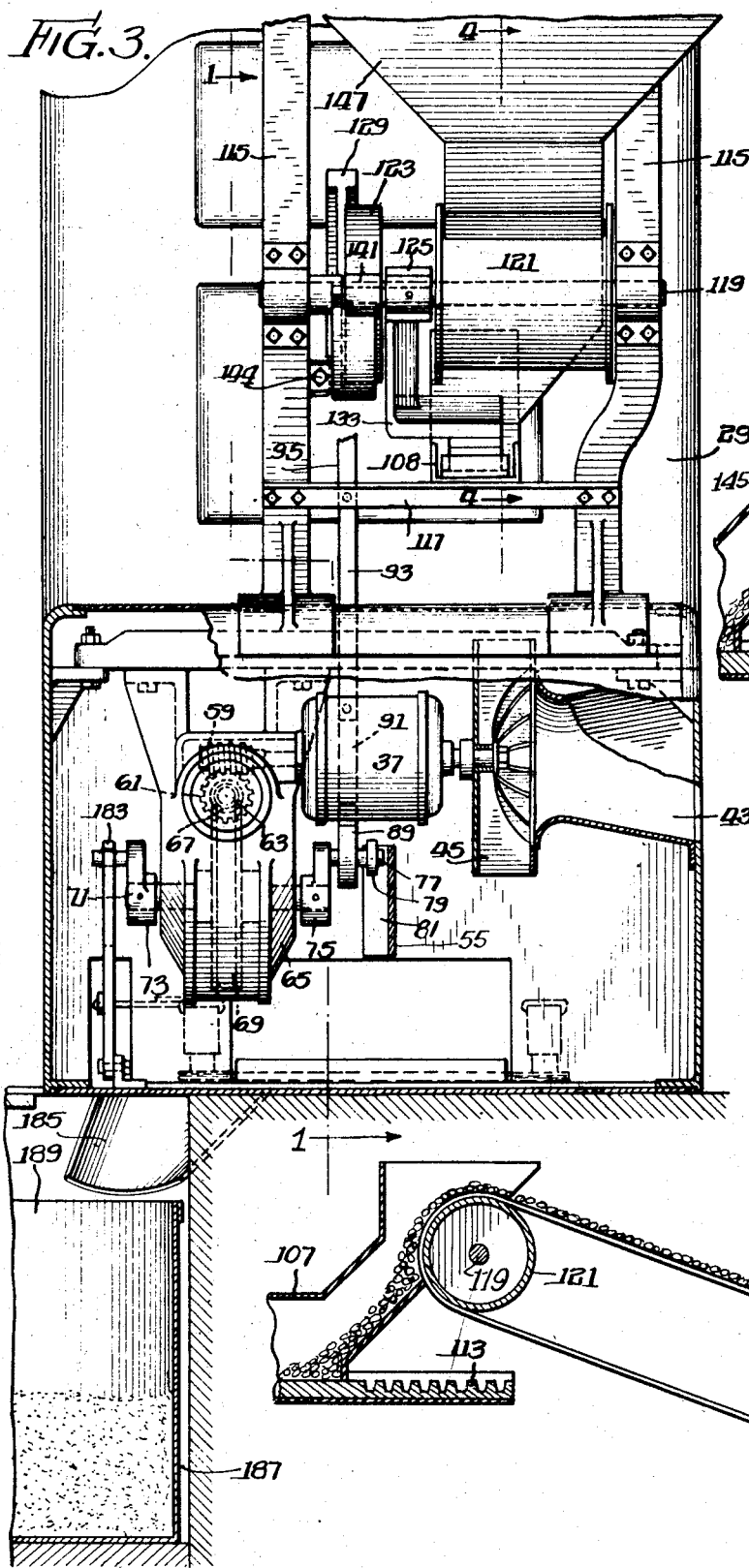
Figure 3 is a front elevation view of the right hand end of the apparatus illustrated in Figure 1, parts of the casing being shown broken away to reveal details of the inner mechanism.
Figure 4:
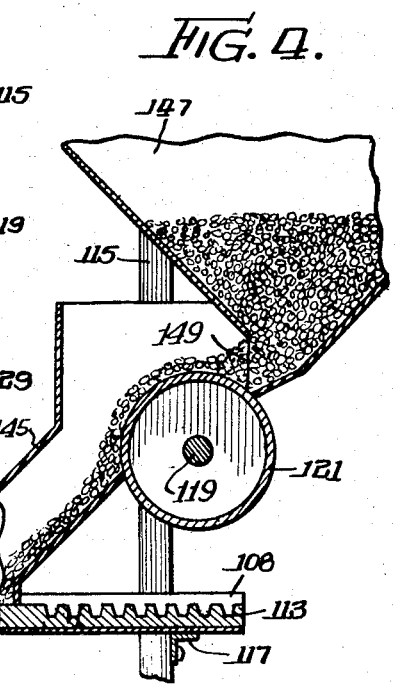
Figure 4 is a view in vertical section taken substantially along the line 4—4 in Figure 3.

The ash discharge space 171 at the discharge end of the grate is preferably boxed in by means of the cover member 173 and the wall members 175 in order to confine the ash dust, the walls being continued around the sides of the firepot as shown in Figure 3 to enclose the ash conveyor throughout its travel. It will be noted that the fuel delivered to the fuel bed falls on an already ignited bed since the fuel forming the notch is in a burning condition, consequently each charge is ignited by direct contact with burning fuel. It will be noted that the rate of travel of the fuel through the fire pot depends upon the amount of each charge. If the movement of the grate section 19 remains constant, the rate of flow of fuel through the fire pot is a direct function of the amount of fuel delivered on the grate during each reciprocation of the grate. If the charges are large, the fuel will be delivered through the fire pot rapidly. If the charge is small, the travel of the fuel bed will be slower. Changing the stroke of the reciprocating grate section will not change the rate of travel of the fuel through the fire pot but will only control the rate at which fuel may be delivered to the furnace without choking it. If the amount of fuel is greater than the capacity of the grate to advance the fuel bed through the fire pot, the furnace will gradually become choked with fuel. By increasing the stroke of the grate section 19, larger quantities of fuel may be charged to the furnace without choking it but the stroke of the grate has no effect whatever upon the rate at which fuel is carried through the fire pot.

Figure 2:
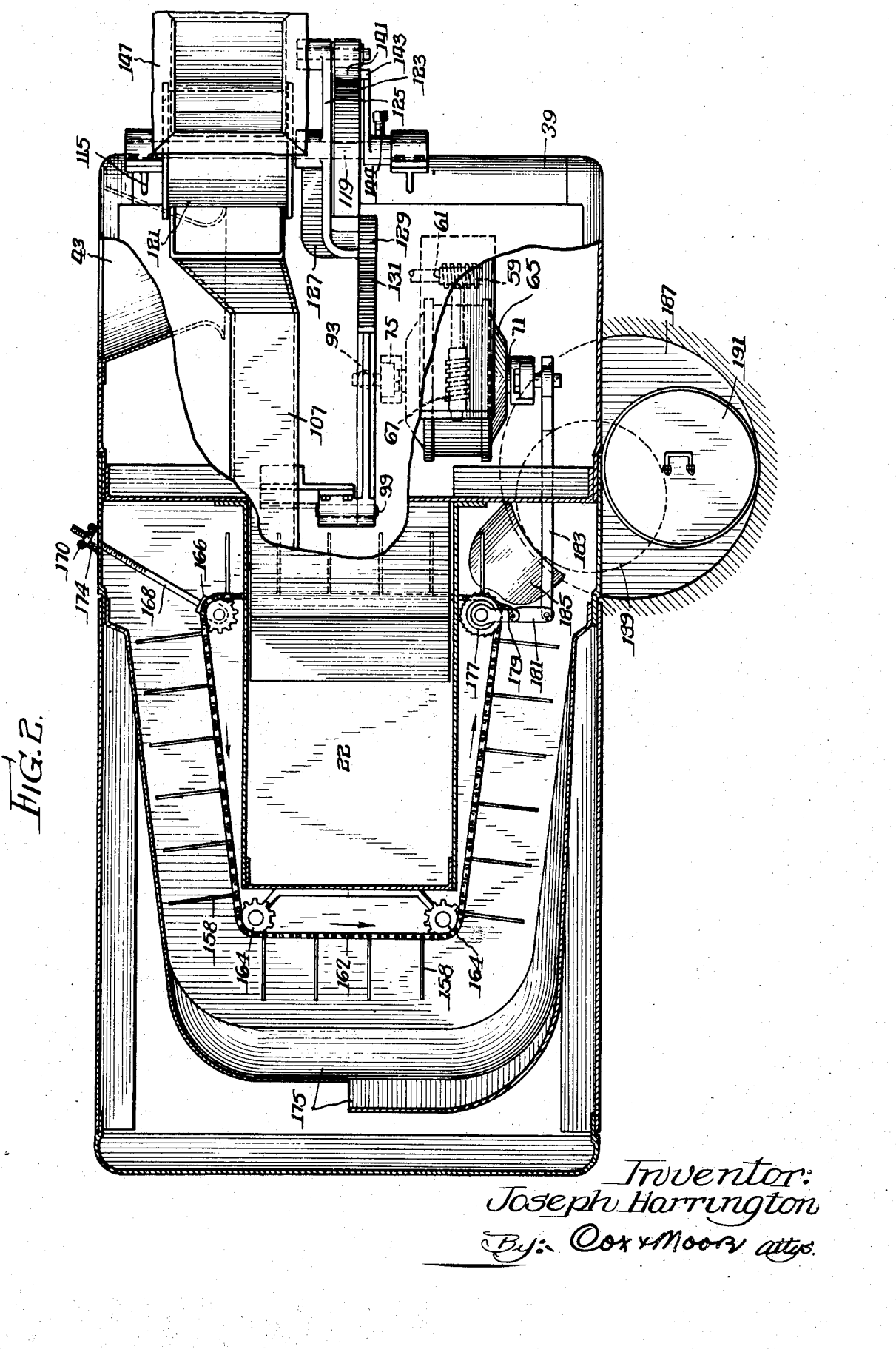
Figure 2 is a view in horizontal section taken substantially along the line 2—2 in Figure 1.

As the fuel travels through the fire pot, it is burned and the resulting ash forced over the end of the stationary grate section 17. The ashes drop to the floor of the furnace in the path of blades 158 of a drag sweep conveyor, comprising an endless chain 162 mounted on sprocket wheels 164 journaled for rotation about vertical axes and located approximately at the four corners of the fire pot so that the conveyor encircles the air space 22. One of the sprocket wheels 164 is mounted in a fitting 166 carried on the end of a threaded rod 168, the opposite end of which extends through a side wall of the furnace and carries an adjustable nut 170 threaded on the projecting end of the rod 168 and resting upon an embossment 174 formed on the outer surface of the furnace wall. By manipulating the nut 170, the tension of the chain 162 may be adjusted in order to keep the same taut upon the sprocket wheels 164. Another of the sprocket wheels 164 is adapted to be driven by means of a ratchet wheel 177, operated by means of a pawl 179 carried on a lever 181, which is pivoted for oscillating movement upon the shaft which carries the ratchet wheel 177 and the sprocket wheel with which said ratchet wheel is associated. The lever 181 is oscillated by means of a connecting rod 183 which extends through the air channel 41 into the housing 39, the rod 183 being connected to the crank 73 so that as the crank is driven by the motor 37 through the double reduction worms 59 and 61, the ratchet wheel 177 will be operated to drag the blades 158 of the continuous ash conveyor in a direction illustrated by arrows in Figure 2 of the drawings so that as the ashes are dumped over the end of the stationary grate section 17 into the path of the blades 158, they will be dragged along the floor of the furnace to a discharge opening 185. The discharge opening 185 leads to a sunken ash pit 187 in which an ash receiver 189 may be arranged in position to receive the ashes discharged through the opening 185.

said ash pit having a readily accessible opening normally closed by a removable cover 191 and through which opening the ash receiver 189 may be inserted in position to receive the discharged ashes.

It will be noted also that the driving power required to reciprocate the fuel grate 19 is a maximum when the grate is in the middle of its stroke and is a minimum when the grate is at either limit of its travel. The maximum power required to operate the fuel-feeding device 15 also is delivered at times when the grate is at the limits of its travel. Further, more power is required to operate the device 15 to advance the pusher 111 than when the pusher is retracted and the mechanism is arranged to operate the pawl-driven ash conveyor, which requires relatively little power while the plunger 111 is being retracted so as to balance the power demand on the motor 37 and make it as nearly constant as possible throughout the operating cycle of the apparatus. By this means, the required capacity and cost of the motor may be kept low and the operation of the apparatus made smooth.

I wish to call attention to the possibility of operating the furnace as a gas producer by so operating the feeding device as to provide a relatively thick layer of green fuel 157 while the air supply under the grate is restricted whereby partial combustion of the fuel is accomplished in the fuel in the lower portions of the bed and destructive distillation and resultant production of combustible gases is accomplished in the overlying layer of green fuel. These gases may be collected above the fuel bed or may be mixed with additional air introduced through tuyères 193 in the combustion space 11.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages; the form herein described being a preferred embodiment for the purpose of illustrating my invention; but I do not herein claim the herein described novel method of delivering or stoking fuel to a combustion zone since the same comprises subject-matter of invention claimed in my copending application, Serial No. 221,622, filed July 27, 1938.

Having thus described my invention, what I claim as new and desire to secure by Letters Patent is as follows:

1. In a furnace, the combination with means forming a combustion chamber, of means forming a back stop, means forming a grate area comprising a plurality of grate sections including a reciprocable grate section extending beneath said back stop and having a fuel supporting portion disposed in front of said back stop, and means to deposit a quantity of fuel as a charge on said grate section when the same is in position forwardly projected in said chamber beneath said back stop, said back stop serving to advance the fuel on the grate section, toward the forward end thereof upon retraction of the grate section beneath said back stop to establish a fuel bed moving progressively across said grate section and over the forward end thereof, said grate area including another grate section mounted with its rearward portions under the forward end of the reciprocable grate section in position to receive the fuel bed therefrom, the forward end of the reciprocating grate section forming a pushing shoulder adapted to advance the fuel bed on said other section toward the forward end thereof during the forward movement of the reciprocating grate section, and means at the forward end of said grate area comprising a stop element spaced above the forward end of said other grate section to define therewith an ash discharge throat opposite said pushing shoulder.

2. In a furnace, the combination with means forming a combustion chamber, of means forming a back stop, means forming a grate area comprising a plurality of grate sections including a reciprocable grate section extending beneath said back stop and having a fuel supporting portion disposed in front of said back stop, and means to deposit a quantity of fuel as a charge on said grate section when the same is in position forwardly projected in said chamber beneath said back stop, said back stop serving to advance the fuel on the grate section toward the forward end thereof upon retraction of the grate section beneath said back stop to establish a fuel bed moving progressively across said grate section and over the forward end thereof, said grate area including another grate section mounted with its rearward portions under the forward end of a reciprocating grate section in position to receive therefrom the fuel bed including an underlying layer of ashes, the forward end of the reciprocating grate section forming a pushing shoulder adapted to advance the fuel bed on said other section toward the forward end thereof during the forward movement of the reciprocating grate section, and retention means at the forward end of said grate area spaced above the forward end of said other grate section to define therewith an ash discharge throat opposite said pushing shoulder, said retention means serving to retain, on said grate area, any unburned fuel overlying the ash layer on said other grate section.

3. In a furnace, the combination with means forming a combustion chamber, of means forming a back stop, a reciprocable grate extending beneath said back stop and having a fuel supporting portion disposed in front of said back stop, and fuel feeding means to deposit a quantity of fuel as a charge on said grate when the same is in position forwardly projected in said chamber beneath said back stop, said back stop serving to advance the fuel on the grate toward the forward end thereof upon retraction of the grate beneath said back stop to establish a fuel bed moving progressively across said grate and to create a void space between the fuel bed and said back stop during the forward movement of said grate, and means to actuate the grate and fuel feeding means in coordinated time relationship, said fuel feeding means being actuated and positioned to drop the fuel charge into said void space and into direct contact with ignited fuel at the rear of said bed substantially when the grate is at the limit of its forward travel under the back-stop.

4. In a furnace, the combination with means forming a combustion chamber, of means forming a back stop, a reciprocable grate extending beneath said back stop and having a fuel supporting portion disposed in front of said back stop, and fuel feeding means to deposit a quantity of fuel as a charge on said grate when the same is in position forwardly projected in said chamber beneath said back stop, said back stop serving to advance the fuel on the grate toward the forward end thereof upon retraction of the grate beneath said back stop to establish a fuel bed moving progressively across said grate, said feeding means having a discharge positioned substantially above said grate so that the fuel, prior to feeding thereof, is entirely isolated from said bed until dropped as a charge on the grate, and means to coordinate the movement of said grate and fuel feeding means.

5. In a furnace, the combination with means forming a combustion chamber, of means forming a back stop, a reciprocable grate extending beneath said back stop and having a fuel supporting portion disposed in front of said back stop, and fuel feeding means to deposit a quantity of fuel as a charge on said grate when the same is in position forwardly projected in said chamber beneath said back stop, said back stop serving to advance the fuel on the grate toward the forward end thereof upon retraction of the grate beneath said back stop to establish a fuel bed moving progressively across said grate, and means to actuate said feeding means and said reciprocable grate in unison, including a common motor for driving both the grate and the feeding means.

6. In a furnace, the combination with means forming a combustion chamber, of means forming a back stop, a reciprocable grate extending beneath said back stop and having a fuel supporting portion disposed in front of said back stop, and fuel feeding means to deposit a quantity of fuel as a charge on said grate when the same is in position forwardly projected in said chamber beneath said back stop, said back stop serving to advance the fuel on the grate toward the forward end thereof upon retraction of the grate beneath said back stop to establish a fuel bed moving progressively across said grate, and means to actuate said feeding means and said reciprocable grate in unison.

7. In a furnace, the combination with means forming a combustion chamber, of means forming a back stop, a reciprocable grate extending beneath said back stop and having a fuel supporting portion disposed in front of said back stop, and fuel feeding means comprising a reciprocable member to deposit a quantity of fuel as a charge on said grate when the same is in position forwardly projected in said chamber beneath said back stop, said back stop serving to advance the fuel on the grate toward the forward end thereof upon retraction of the grate beneath said back stop to establish a fuel bed moving progressively across said grate, and means to actuate said feeding means and said reciprocable grate in unison, and means to adjust the stroke of said grate and of said member to determine the rate of fuel movement on said grate.

8. In a furnace, the combination with means forming a fire pot, of grate means for supporting a fuel bed in and advancing the same through said pot, said grate means comprising a stationary grate having an ash discharge end, a reciprocating grate having portions at the charging end of said pot and having an end movably mounted above the stationary grate and movable toward and away from the said discharge end thereof, said reciprocating grate being adapted to receive a charge of fuel thereon at the charging end of said pot, and a back stop at said charging end in position to prevent fuel from moving with said reciprocating grate during the travel thereof away from the discharge end of said grate means, an ash gate disposed above and in spaced relation with the discharge end of said stationary grate, the reciprocating grate, when advancing toward the discharge end of the grate means, serving to push portions of the fuel bed toward the ash gate whereby the underlying burned ash in said bed may be discharged through the space between the ash gate and the discharge end of the stationary grate, said gate serving to retain unburned fuel on said grate means.

9. In a furnace, the combination with means forming a fire pot, of grate means for supporting a fuel bed in and advancing the same through said pot, said grate means comprising a stationary grate having an ash discharge end, a reciprocating grate having portions at the charging end of said fire pot and having portions mounted for movement above the stationary grate toward and away from the discharge end thereof, said reciprocating grate being adapted to receive fuel charged thereon at the charging end of said pot to replenish said fuel bed, and a back stop in position at said charging end to prevent fuel from moving with said reciprocating grate during the travel thereof away from the discharge end of said grate means, said back stop riding upon said reciprocating grate during the movement thereof and forming a seal with said reciprocating grate to prevent the escape of fuel therebetween from said fire pot, an ash gate disposed above and in spaced relationship with respect to the discharge end of said stationary grate, said reciprocating grate, when advancing toward the discharge end of the grate means, serving to push portions of the fuel bed toward the ash gate whereby the underlying burned ash in said fuel bed may be discharged through the space between the ash gate and the discharge end of the stationary grate.

10. In a furnace, the combination with means forming a fire pot, of grate means for supporting a fuel bed in and advancing the same through said pot, said grate means comprising a stationary grate having an ash discharge end, a reciprocating grate having portions at the charging end of said fire pot and having portions mounted for movement above the stationary grate toward and away from the discharge end thereof, said reciprocating grate being adapted to receive fuel charged thereon at the charging end of said pot to replenish said fuel bed, and a back stop in position at said charging end to prevent fuel from moving with said reciprocating grate during the travel thereof away from the discharge end of said grate means, said back stop comprising means held in position above said reciprocating grate whereby the back stop is urged by gravity to ride upon said reciprocating grate and form therewith a sliding seal to prevent the escape of fuel from said fire pot therebetween, an ash gate disposed above and in spaced relationship with respect to the discharge end of said stationary grate, said reciprocating grate, when advancing toward the discharge end of the grate means, serving to push portions of the fuel bed toward the ash gate whereby the underlying burned ash in said fuel bed may be discharged through the space between the ash gate and the discharge end of the stationary grate.

11. In a furnace, the combination with means forming a fire pot, a grate means for supporting a fuel bed in and advancing the same through said pot, said grate means comprising a stationary grate having an ash discharge end, a reciprocating grate having portions at the charging end of said fire pot and having portions mounted for movement above the stationary grate toward and away from the discharge end thereof, said reciprocating grate being adapted to receive fuel charged thereon at the charging end of said pot to replenish said fuel bed, and a back stop in position at said charging end to prevent fuel from moving with said reciprocating grate during the travel thereof away from the discharge end of said grate means, said back stop being supported above said reciprocating grate in position to ride thereon and form a sliding seal with said reciprocating grate to prevent the escape of fuel from said fire pot therebetween, said back stop being formed with a surface facing upwardly in said fire pot to receive at least a portion of the weight of said fuel on said stop to urge the same downwardly and into sliding engagement with said reciprocating grate to enhance the fuel retaining effect of said seal, an ash gate disposed above and in spaced relationship with respect to the discharge end of said stationary grate, said reciprocating grate, when advancing toward the discharge end of the grate means, serving to push portions of the fuel bed toward the ash gate whereby the underlying burned ash in said fuel bed may be discharged through the space between the ash gate and the discharge end of the stationary grate.

12. In a furnace, the combination with means forming a fire pot, of grate means for supporting a fuel bed in and advancing the same through said pot, said grate means comprising a stationary grate having an ash discharge end, a reciprocating grate having portions at the charging end of said fire pot and having portions mounted for movement above the stationary grate toward and away from the discharge end thereof, said reciprocating grate being adapted to receive fuel charged thereon at the charging end of said pot to replenish said fuel bed, and a back stop in position at said charging end to prevent fuel from moving with said reciprocating grate during the travel therof away from the discharge end of said grate means, said back stop being supported in position above the reciprocating grate in guideways for movement toward and away from said reciprocating grate whereby said back stop is normally pressed by gravity upon and forms a sliding seal with said reciprocating grate to prevent the escape of fuel from said fire pot therebetween.

JOSEPH HARRINGTON.